(12) United States Patent
Chawda (10) Patent No.: US 10,939,520 B1
(45) Date of Patent: Mar. 2, 2021

(54) CURRENT CONVERTER CIRCUIT FOR AIRFIELD GROUND LIGHTING

(71) Applicant: Honeywell International Inc., Morris Plains, NJ (US)

(72) Inventor: Nipun Kumar Chawda, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/814,366

(22) Filed: Mar. 10, 2020

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 45/14* | (2020.01) |
| *H05B 45/325* | (2020.01) |
| *H05B 45/34* | (2020.01) |
| *B64F 1/20* | (2006.01) |
| *B64D 47/02* | (2006.01) |
| *H05B 45/36* | (2020.01) |

(52) U.S. Cl.
CPC .............. *H05B 45/14* (2020.01); *B64D 47/02* (2013.01); *B64F 1/20* (2013.01); *H05B 45/325* (2020.01); *H05B 45/34* (2020.01); *H05B 45/36* (2020.01); *B64D 2203/00* (2013.01)

(58) Field of Classification Search
None
See application file for complete search history.

(56) References Cited

U.S. PATENT DOCUMENTS

| | | | |
|---|---|---|---|
| 5,926,115 A | 7/1999 | Schleder et al. | |
| 7,605,570 B2 | 10/2009 | Liu et al. | |
| 8,575,862 B2 | 11/2013 | Dubrovsky | |
| 2011/0285320 A1 | 11/2011 | Kustra | |
| 2013/0127362 A1* | 5/2013 | Trainor | G01R 31/44 315/224 |
| 2014/0328096 A1 | 11/2014 | Gumaer | |
| 2017/0179813 A1* | 6/2017 | Fu | H02M 5/20 |
| 2018/0263090 A1* | 9/2018 | Perichon | H02M 7/217 |

* cited by examiner

*Primary Examiner* — Anh Q Tran
(74) *Attorney, Agent, or Firm* — Brooks, Cameron & Huebsch, PLLC (57) ABSTRACT

Methods, devices, and systems for a current converter circuit for airfield ground lighting are described herein. In some examples, one or more embodiments include a bi-directional switch, an inductor to store energy in response to the bi-directional switch being on, and an output capacitor to discharge power to an LED, where the bi-directional switch can switch off to cause the inductor to discharge to the output capacitor in response to a voltage across the output capacitor being less than a threshold voltage.

20 Claims, 4 Drawing Sheets

CURRENT CONVERTER CIRCUIT FOR AIRFIELD GROUND LIGHTING

TECHNICAL FIELD

The present disclosure relates to methods, devices, and systems for a current converter circuit for airfield ground lighting.

BACKGROUND

Airfields can include lighting systems to provide visual cues and/or signals for the airfield. For example, airfield lighting systems can include luminaires in order to direct aircraft and/or other vehicles in and/or around the airfield. The airfield lighting systems may, in some instances, be mandated by regulatory bodies such as the International Civil Aviation Organization (ICAO) and/or Federal Aviation Administration (FAA), among other examples. Airfield lighting systems can provide safe and efficient way to regulate airfield traffic.

Airfield luminaires can include light emitting diodes (LEDs) as light sources. For example, airfield luminaires can include LEDs in order to provide visual cues and/or signals for aircraft and/or other vehicles in and/or around approach areas, runways, taxiways, etc.

DETAILED DESCRIPTION

Methods, devices, and systems for a current converter circuit for airfield ground lighting are described herein. In some examples, one or more embodiments include a bi-directional switch, an inductor to store energy in response to the bi-directional switch being on, and an output capacitor to discharge power to an LED, where the bi-directional switch can switch off to cause the inductor to discharge to the output capacitor in response to a voltage across the output capacitor being less than a threshold voltage.

Airfield luminaires can be located in and/or around an airport surface. As used herein, the term "airfield luminaire" refers to a lighting unit including an electric lamp and associated wiring. For example, airfield luminaires can include an LED light source and can be located around approach ways, mounted in the airport surface on runways, taxiways, intersections, etc.

Utilizing LEDs as light sources around in airfield luminaires can allow for a longer operating life and/or lower maintenance for the luminaires relative to previous approaches. For example, LEDs may last longer, be more energy efficient, and/or have to be replaced less frequently than halogen light sources. LEDs can, accordingly, allow for cost savings relative to previous approaches.

Airfield luminaires utilizing LED light sources can be solid-state devices and as a result, can be more durable than halogen light sources. However, as a solid-state device, airfield luminaires including an LED light source may include certain operating conditions in order to operate similarly to halogen light sources. For example, since an LED light source airfield luminaire utilizes active switching in the electrical circuit, the power system for the LED light source may become unstable.

A current converter circuit for airfield ground lighting, in accordance with the present disclosure, can be utilized to reliably operate LED light sources in an airfield luminaire. The current converter circuit can utilize an inductor and a bi-directional switch to cause the inductor to discharge stored energy to an output capacitor which can provide stable power to the LED across an alternating current (AC) cycle of an AC source. Accordingly, the current converter circuit can provide a near unity input power factor which can be compatible with existing airfield infrastructure, such as source regulators of thyristor and insulated-gate bipolar transistor (IGBT) types, while providing simple and reliable performance in a compact form factor, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
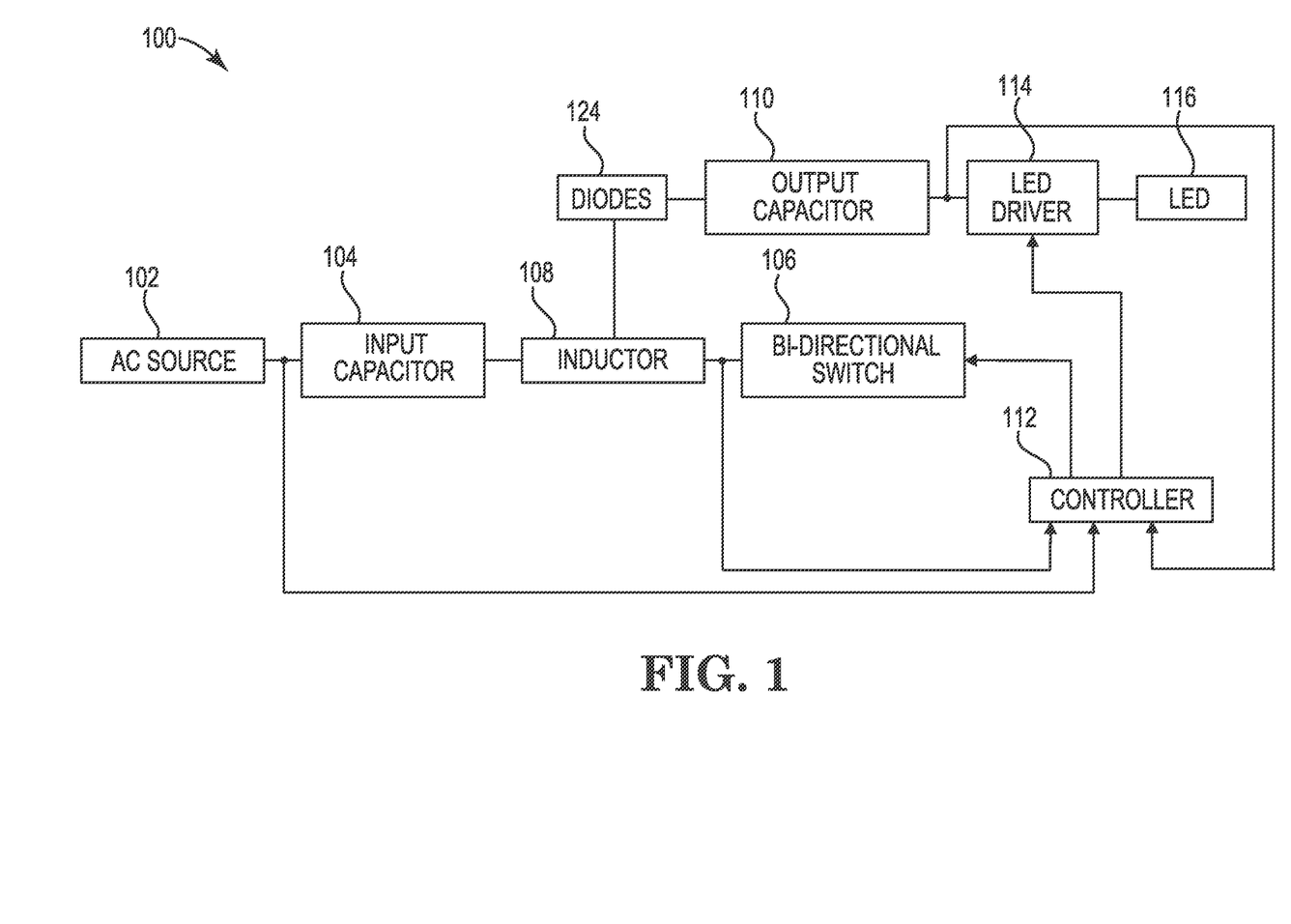
FIG. 1 is an example of a system for a current converter circuit for airfield ground lighting, in accordance with one or more embodiments of the present disclosure.

FIG. 1 is an example of a system 100 for a current converter circuit for airfield ground lighting, in accordance with one or more embodiments of the present disclosure. The system 100 can include an alternating current (AC) source 102, an input capacitor 104, a bi-directional switch 106, an inductor 108, an output capacitor 110, a controller 112, a light emitting diode (LED) driver 114, an LED 116, and diodes 124.

As illustrated in FIG. 1, a bi-directional switch 106 can be coupled to inductor 108 and be controlled by controller 112. As used herein, the term "bi-directional switch" refers to a device that allows a two-way bi-directional flow of current when switched on and blocks a bi-directional flow of current when powered off. For example, the bi-directional switch 106 can allow current to flow bi-directionally through the bi-directional switch 106 when switched on (e.g., by controller 112) and block the flow of current through the bi-directional switch 106 when switched off (e.g., by controller 112).

Although not illustrated in FIG. 1 for clarity and so as not to obscure embodiments of the present disclosure, the bi-directional switch 106 can include a first metal-oxide-semiconductor field-effect transistor (MOSFET) and a second MOSFET. For example, the bi-directional switch 106 can utilize a first MOSFET and a second MOSFET to allow current to flow bi-directionally through the bi-directional switch 106 when switched on and block the flow of current through the bi-directional switch 106 when switched off, as is further described in connection with FIG. 2.

Current can be provided to the system 100 by the AC source 102. As used herein, the term "AC source" refers to an origination point of electrical current in which the direction of the flow of electrons switches back and forth at regular cycles. The AC source 102 can be utilized to power airfield luminaires on an airfield. For example, the LED 116 may be included in an airfield luminaire, and the AC source 102 can provide electrical current to power the LED 116, as is further described herein. Although not illustrated in FIG. 1 for clarity and so as not to obscure embodiments of the present disclosure, an AC source regulator can be connected between the AC source 102 and the input capacitor 104 to maintain a constant current in a range of 2.8 amperes (A) to 6.6 A to regulate the light intensity of the LED 116, as is further described in connection with FIG. 3.

As used herein, the term "LED" refers to a semiconductor light source that emits light when current flows through it. For example, the LED 116 can be a semiconductor light source included in an airfield luminaire. When current flows through the LED 116, the LED 116 can emit visible light. The light emitted from the LED 116 can provide visual cues and/or signals for an airfield.

As shown in FIG. 1, an inductor 108 can be coupled to input capacitor 104, bi-directional switch 106, and diodes 124. As used herein, the term "inductor" refers to an electrical device that stores energy in a magnetic field when current flows through it. For example, the inductor 108 can store energy in response to the bi-directional switch 106 being switched on and current (e.g., from the AC source 102) flowing through the inductor 108.

As shown in FIG. 1, an output capacitor 110 can be coupled to the diodes 124 and the LED driver 114. As used herein, the term "capacitor" refers to an electrical device that stores electrical energy in an electric field. The output capacitor 110 can receive energy from the inductor 108 and can discharge stored energy to power the LED 116, as is further described herein.

The system 100 can include a controller 112. The controller 112 can monitor various characteristics of the current converter circuit and control the operation of various components of the current converter system. For example, the controller 112 can monitor a voltage across the output capacitor 110. Further, the controller 112 can control the operation of the bi-directional switch 106 and the LED driver 114.

The bi-directional switch 106 can be switched off to cause the inductor 108 to discharge to the output capacitor 110 in response to a voltage across the output capacitor 110 being less than a threshold voltage. For example, the controller 112 can monitor the voltage across the output capacitor 110. In response to the monitored voltage across the output capacitor 110 being less than a threshold voltage, the controller 112 can switch the bi-directional switch 106 from on (e.g., a state in which the bi-directional switch 106 can allow current to flow bi-directionally through the bi-directional switch 106) to off (e.g., a state in which the bi-directional switch 106 can block the flow of current through the bi-directional switch 106). As a result of the bi-directional switch 106 switching off, energy stored in the inductor 108 can discharge to the output capacitor 110.

As shown in FIG. 1, diodes 124 can be coupled to the inductor 108 and the output capacitor 110. As used herein, the term "diode" refers to an electrical device that conducts current primarily in one direction. The diodes 124 can include and/or refer to a number of diodes, and can direct the energy discharged from the inductor 108 to the output capacitor 110 based on an input cycle of the AC source 102, as is further described in connection with FIG. 2.

The output capacitor 110 can discharge energy to power the LED 116 via the LED driver 114. As used herein, the term "LED driver" refers to a device that converts higher voltage AC current to lower voltage direct current (DC) to power an LED. For instance, the LED driver 114 can regulate the power provided from the AC source 102 and the current converter circuit to the LED 116 to prevent the LED 116 from being provided power outside of the rated operating parameters for the LED 116, which can prevent the LED 116 from being damaged or destroyed.

The controller 112 can control an intensity of the light emitted by the LED 116 using pulse width modulation (PWM). As used herein, the term "PWM" refers to a method of reducing the average power delivered by an electrical signal by dividing the signal into discrete high and low parts over a particular time interval. For example, the controller 112 can control the intensity of the light emitted by the LED 116 by reducing the power delivered by the LED driver 114 to the LED 116 by varying the high parts of the electrical control signal delivered to the LED driver 114 over a particular time interval. Controlling the intensity of the light output of the LED 116 may be utilized for different category (CAT) operating conditions (e.g., CAT-I, CAT-II or CAT-Ill) for instrument landing system (ILS) operations at the airfield, among other examples.

Figure 2:
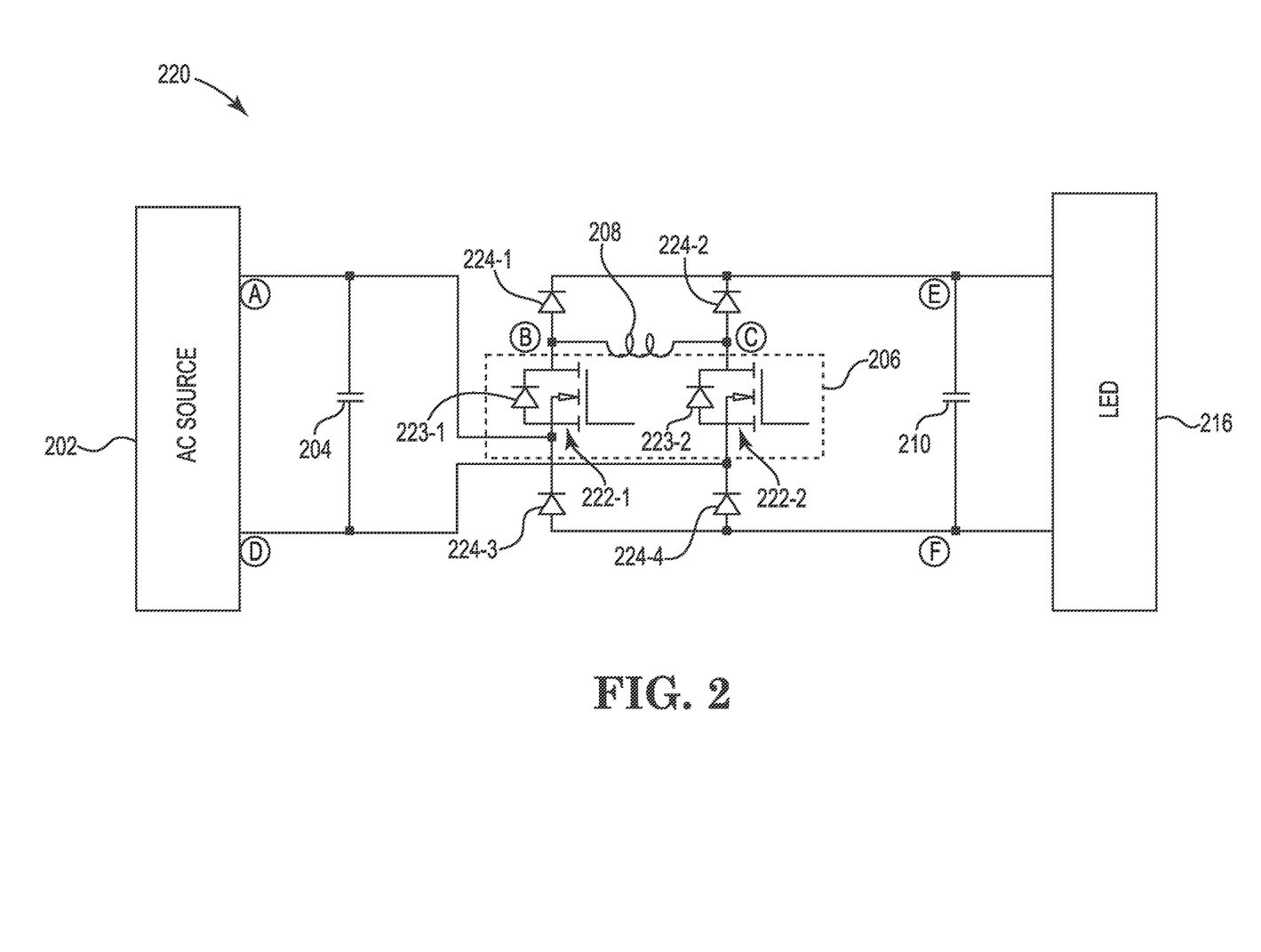
FIG. 2 is an example of a current converter circuit for airfield ground lighting, in accordance with one or more embodiments of the present disclosure.

FIG. 2 is an example of a current converter circuit 220 for airfield ground lighting, in accordance with one or more embodiments of the present disclosure. The current converter circuit 220 can include an AC source 202, an input capacitor 204, a bi-directional switch 206, an inductor 208, an output capacitor 210, an LED 216, and diodes 224-1, 224-2, 224-3, 224-4. The bi-directional switch 206 can include a first metal-oxide-semiconductor field-effect transistor (MOSFET) 222-1 and a second MOSFET 222-2.

As illustrated in FIG. 2, the first MOSFET 222-1 can be coupled to the inductor 208 and the diodes 224-1 and 224-3 and the second MOSFET 222-2 can be coupled to the inductor 208 and the diodes 224-2 and 224-4. As used herein, the term MOSFET refers to a device which is a type of insulated-gate field-effect transistor used to switch electronic signals in a circuit. For example, the first MOSFET 222-1 and the second MOSFET 222-2 can be utilized in conjunction with each other to switch the bi-directional switch 206 from on to off and/or vice versa.

The first MOSFET 222-1 and the second MOSFET 222-2 can be connected to the input capacitor 204. For example, the input capacitor 204 can be connected to a source of the first MOSFET 222-1 and a source of the second MOSFET 222-2.

The input capacitor 204 can be connected to the AC source 202 and can charge in response to the bi-directional switch 206 being on. The input capacitor 204 can charge to a voltage equivalent to an on-state resistance of the first MOSFET 222-1 and a DC resistance of the inductor 208. The input capacitor 204 can buffer the current converter circuit 220 and maintain a predetermined ripple voltage for the current converter circuit 220.

Although the current converter circuit 220 is illustrated in FIG. 2 as including a single input capacitor 204, embodiments of the present disclosure are not so limited. For example, the current converter circuit 220 can include multiple input capacitors 204 (e.g., a bank of input capacitors).

The inductor 208 can be connected between the first MOSFET 222-1 and the second MOSFET 222-2. For example, the inductor 208 can be connected between a drain of the first MOSFET 222-1 and a drain of the second MOSFET 222-2. As a result, the inductor 208 can store energy in response to the bi-directional switch 206 being on. For example, as current flows through the first MOSFET 222-1, the inductor 208, and the second MOSFET 222-2, the inductor 208 can store energy.

The output capacitor 210 can be connected to the inductor 208 and to the LED 216. Although not illustrated in FIG. 2 for clarity and so as not to obscure embodiments of the present disclosure, the output capacitor 210 can be connected to the LED 216 via an LED driver. The output capacitor 210 can discharge to power the LED 216. The inductor 208 can discharge energy to the output capacitor 210, as is further described herein.

Although the current converter circuit 220 is illustrated in FIG. 2 as including a single output capacitor 210, embodiments of the present disclosure are not so limited. For example, the current converter circuit 220 can include multiple output capacitors 210 (e.g., a bank of output capacitors) to discharge to power the LED 216.

As illustrated in FIG. 2, the current converter 220 can include four diodes 224. A first diode 224-1 can be connected to a drain of the first MOSFET 222-1 and the output capacitor 210. A second diode 224-2 can be connected to a drain of the second MOSFET 222-2 and the output capacitor 210. A third diode 224-3 can be connected to a source of the first MOSFET 222-1. A fourth diode 224-4 can be connected to a source of the second MOSFET 222-2. The current path through the current converter circuit 220 and through the diodes 224 can be based on the cycle of the AC source 202, as is further described herein.

Although not illustrated in FIG. 2 for clarity and so as not to obscure embodiments of the present disclosure, the current converter circuit 220 can be connected to a controller. The controller can monitor a voltage across the output capacitor 210. In response to the voltage across the capacitor being less than a threshold voltage, the controller can switch the bi-directional switch 206 to off.

As a result of the bi-directional switch 206 being switched off, the inductor 208 can discharge to the output capacitor 210. The current path from the inductor 208 to the output capacitor 210 can be based on the cycle of the AC source 202. For example, the particular diodes 224 which direct the current from the inductor 208 discharging can depend on whether the bi-directional switch 206 is switched from on to off while the AC source 202 is in an input positive cycle or an input negative cycle, as is further described herein.

As previously described above, the current path through the converter circuit 220 and through the diodes 224 can be based on the cycle of the AC source 202. During an input positive cycle of the AC source 202 and while the bi-directional switch 206 is on, the current from the AC source 202 can flow from point A (e.g., points on the current converter circuit 220 illustrated in FIG. 2 surrounded by a circle) to the first MOSFET 222-1, to point B, through the inductor 208 to point C, and back to the AC source 202 at point D. During the input positive cycle of the AC source 202 and while the bi-directional switch 206 is on, the inductor 208 can store energy.

In response to the bi-directional switch 206 being switched off (e.g., during the input positive cycle of the AC source 202), the inductor 208 can discharge to the output capacitor 210. In response to the inductor 208 discharging, the second diode 224-2 can direct current to the output capacitor 210, and the third diode 224-3 can direct current from the output capacitor 210 to the first MOSFET 222-1. Accordingly, during an input positive cycle of the AC source 202 while the bi-directional switch 206 is switched off, the current can flow from point C (e.g., in response to the inductor 208 discharging) through the second diode 224-2 to point E, from point E to the output capacitor 210, from the output capacitor 210 to point F, and from point F through the third diode 224-3 to the first MOSFET 222-1. The current can flow to an internal diode 223-1 coupled to the first MOSFET 222-1.

During an input negative cycle of the AC source 202 and while the bi-directional switch 206 is on, the current from the AC source 202 can flow from point D to the second MOSFET 222-2, to point C, through the inductor 208 to point B, and back to the AC source 202 at point A. During the input negative cycle of the AC source 202 and while the bi-directional switch 206 is on, the inductor 208 can store energy.

In response to the bi-directional switch 206 being switched off (e.g., during the input negative cycle of the AC source 202), the inductor 208 can discharge to the output capacitor 210. In response to the inductor 208 discharging, the first diode 224-1 can direct current to the output capacitor 210, and the fourth diode 224-4 can direct current from the output capacitor 210 to the second MOSFET 222-2. Accordingly, during an input negative cycle of the AC source 202 while the bi-directional switch 206 is switched off, the current can flow from point B (e.g., in response to the inductor 208 discharging) through the first diode 224-1 to point E, from point E to the output capacitor 210, from the output capacitor 210 to point F, and from point F through the fourth diode 224-4 to the second MOSFET 222-2. The current can flow to an internal diode 223-2 coupled to the second MOSFET 222-2.

Figure 3:
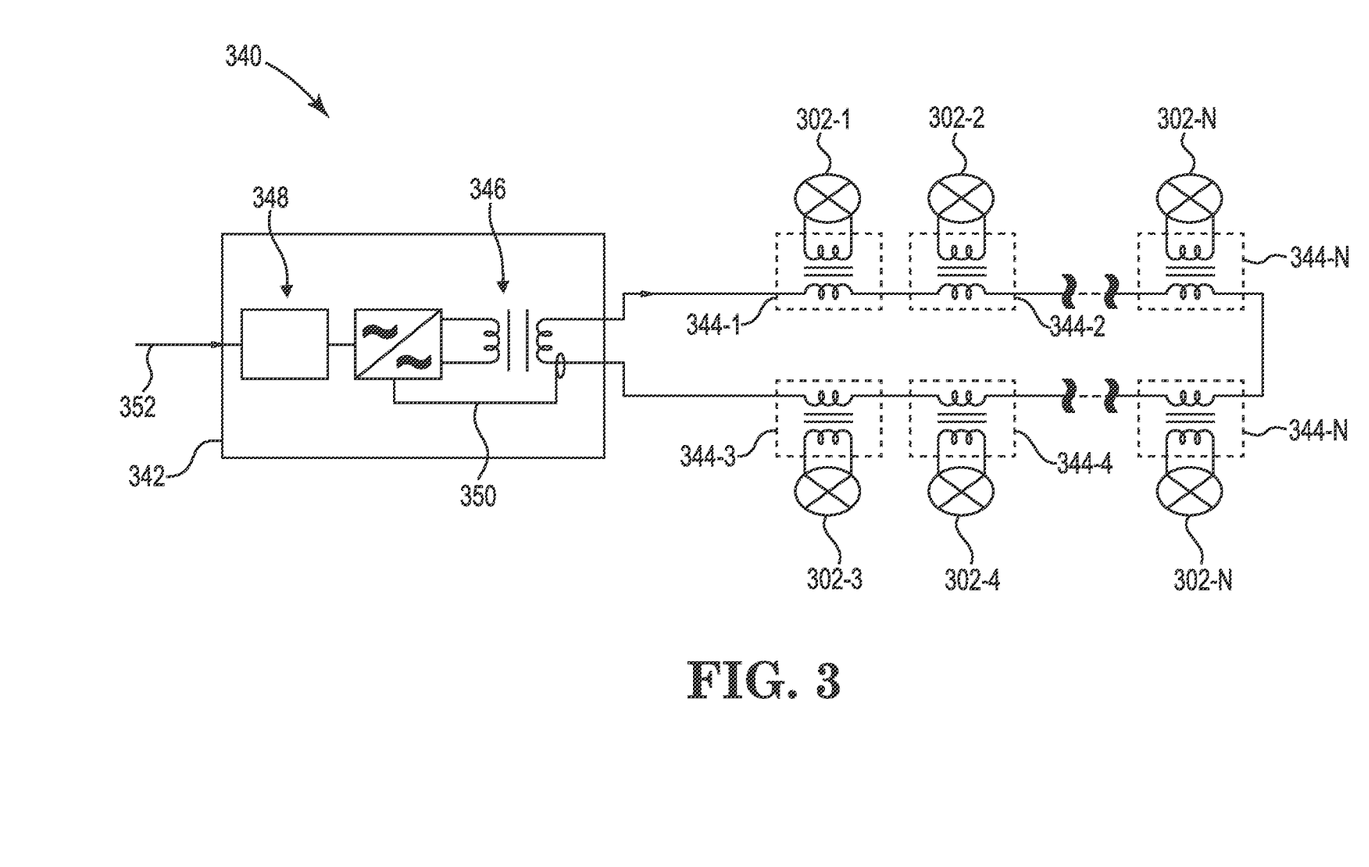
FIG. 3 is an example of an airfield ground lighting circuit for a current converter circuit for airfield ground lighting, in accordance with one or more embodiments of the present disclosure.

FIG. 3 is an example of an airfield ground lighting circuit 340 for a current converter circuit for airfield ground lighting, in accordance with one or more embodiments of the present disclosure. The airfield ground lighting circuit 340 can include an AC mains 352, a constant current regulator 342, airfield luminaires 302-1, 302-2, 302-3, 302-4, 302-N, and series isolation transformers 344-1, 344-2, 344-3, 344-4, 344-N. The constant current regulator 342 can include a power transformer 346, an input filter 348, and a feedback control 350.

As illustrated in FIG. 3, the airfield ground lighting circuit 340 can include airfield luminaires 302-1, 302-2, 302-3, 302-4, 302-N. The airfield luminaires 302-1, 302-2, 302-3, 302-4, 302-N can include LEDs which can be utilized to direct aircraft and/or other vehicles in and/or around the airfield.

The airfield luminaires 302-1, 302-2, 302-3, 302-4, 302-N can be connected to the airfield ground lighting circuit 340 via series isolation transformers 344-1, 344-2, 344-3, 344-4, 344-N, respectively. As used herein, the term "series isolation transformer" refers to a device to transfer electrical power from a power source to a load. For example, the series isolation transformers 344-1, 344-2, 344-3, 344-4, 344-N can transfer electrical power from an AC mains 352 to each of the airfield luminaires 302-1, 302-2, 302-3, 302-4, 302-N, respectively.

As illustrated in FIG. 3, the airfield ground lighting circuit 340 can be connected to an AC mains 352. As used herein, the term "AC mains" refers to a power source to provide power to the airfield ground lighting circuit 330. The AC mains 352 can provide a 50 Hz/60 Hz AC power source in a range of 2.8 A to 6.6 A, although embodiments of the present disclosure are not limited to a 50 Hz/60 Hz AC power source and/or a range of 2.8 A to 6.6 A.

The AC mains 352 can provide power to the airfield ground lighting circuit 340 via the constant current regulator 342. As used herein, the term "constant current regulator" refers to a device to regulate an AC power source. For example, the constant current regulator 342 can regulate current from the AC mains 352 by providing current to the airfield ground lighting circuit 340 in the range of 2.8 A to 6.6 A, as well as provide isolation between the AC mains 342 and the rest of the airfield ground lighting circuit 340 in the event of an electrical power surge.

The constant current regulator 342 can include a power transformer 346. The power transformer 346 can isolate an AC signal (e.g., from the AC mains 352) from the airfield ground lighting circuit 340.

The power transformer 346 can be connected to an input filter 348. The input filter 348 can attenuate rippling that may occur as a result of the operation of the constant current regulator 342.

The constant current regulator 342 can include feedback control 350. The feedback control 350 can include a controller (not illustrated in FIG. 3 for clarity and so as not to obscure embodiments of the present disclosure) that can monitor an input current from the AC mains 352 to keep the input voltage and current of the AC signal in phase.

Figure 4:
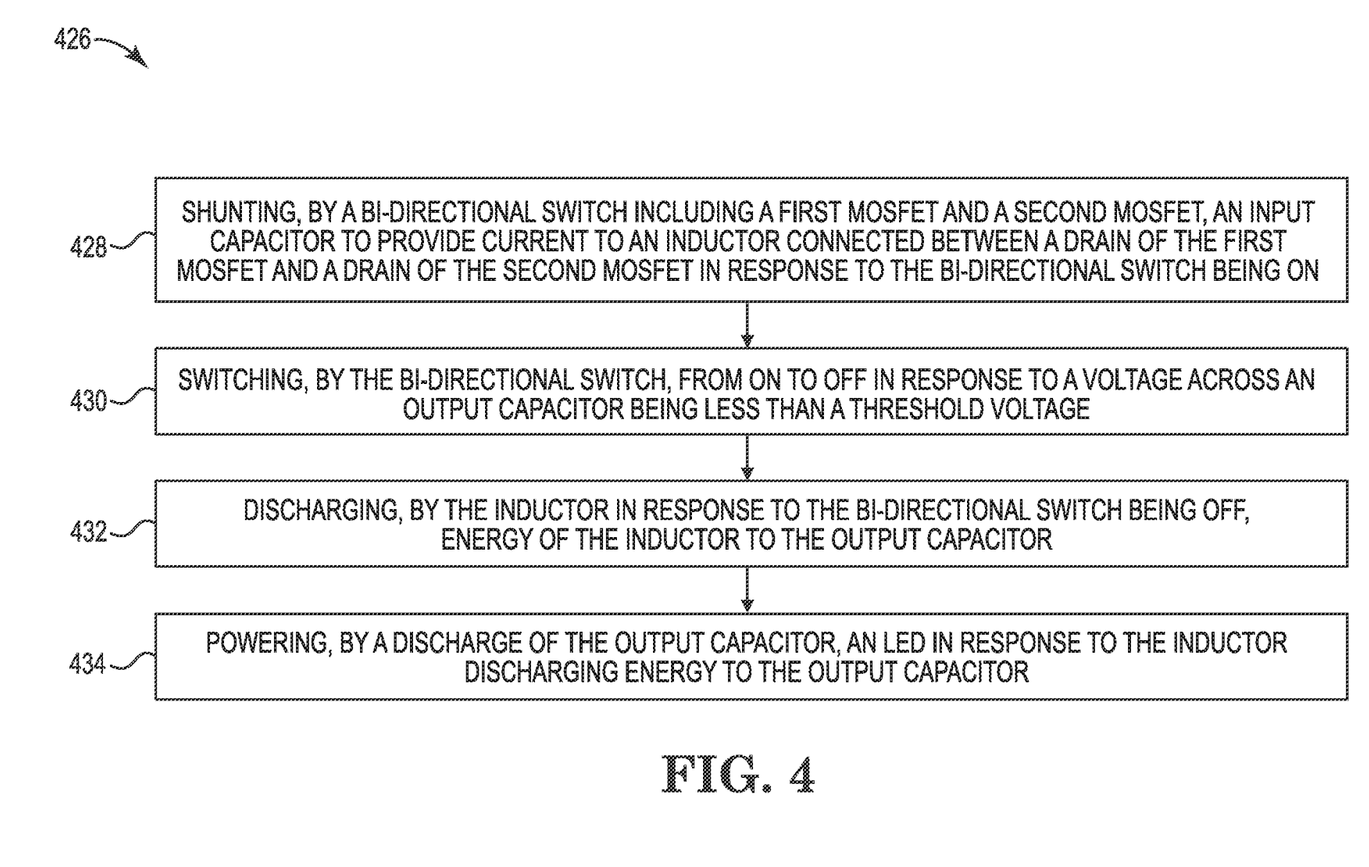
FIG. 4 is an example of a flow chart of a method for operating a current converter circuit for airfield ground lighting, in accordance with one or more embodiments of the present disclosure.

FIG. 4 is an example of a flow chart of a method 426 for operating a current converter circuit for airfield ground lighting, in accordance with one or more embodiments of the present disclosure. The method 426 may be performed by a current converter circuit (e.g., current converter circuit 220, previously described in connection with FIG. 1) and a controller (e.g., controller 112, previously described in connection with FIG. 1).

At 428, the method 426 can include shunting, by a bi-directional switch including a first MOSFET and a second MOSFET, an input capacitor to provide current to an inductor connected between a drain of the first MOSFET and a drain of the second MOSFET in response to the bi-directional switch being switched on. The input capacitor can be connected to an AC source. Shunting the input capacitor can allow current to flow through the inductor (e.g., while the bi-directional switch is switched on). As a result of current flowing through the inductor, the inductor can store energy.

As previously described in connection with FIG. 2, the AC source can include an input positive cycle and an input negative cycle. During the input positive cycle, current can be directed from the AC source, through the inductor by the first MOSFET, and back to the AC source. During the input negative cycle, current can be directed from the AC source, through the inductor by the second MOSFET, and back to the AC source.

At 430, the method 426 can include switching, by the bi-directional switch, from on to off in response to a voltage across an output capacitor being less than a threshold voltage. For example, a controller can monitor the voltage across the output capacitor. In response to the voltage across the output capacitor being less than the threshold voltage, the controller can cause the bi-directional switch to switch from on to off.

At 432, the method 426 can include discharging, by the inductor in response to the bi-directional switch being off, energy of the inductor to the output capacitor. As previously described above, the inductor can store energy when the bi-directional switch is switched on. The energy stored by the inductor can be discharged to the output capacitor in response to the bi-directional switch being switched off by the controller and can be directed by diodes of the current converter circuit, as is further described herein.

During an input positive cycle of the AC source, the current discharged from the inductor can be directed to the output capacitor by a second diode, and current from the output capacitor can be directed to the first MOSFET by a third diode. During an input negative cycle of the AC source, the current discharged from the inductor can be directed to the output capacitor by a first diode, and current from the output capacitor can be directed to the second MOSFET by a fourth diode.

Switching the bi-directional switch can occur at a predetermined switching frequency. For example, the bi-directional switch may be switched at 100 kilohertz (KHz) based on the AC source providing current in a range of 2.8 A to 6.6 A. Such switching allows the inductor to store energy when the bi-directional switch is switched on and allows the stored energy of the inductor to be discharged to the output capacitor when the bi-directional switch is switched off.

At 434, the method 426 can include powering, by a discharge of the output capacitor, an LED in response to the inductor discharging energy to the output capacitor. For example, the output capacitor can provide energy to power the LED such that the LED can emit visible light. The light emitted from the LED can provide visual cues and/or signals for an airfield to direct aircraft and/or other vehicles in and/or around the airfield.

A current converter circuit, in accordance with the present disclosure, can be utilized to provide a compact, simple, and reliable way to operate LED light sources in an airfield luminaire located on an airfield. Utilizing an inductor to store energy when a bi-directional switch is switched on allows the stored energy of the inductor to be discharged to the output capacitor when the bi-directional switch is switched off, where the output capacitor can power the LED in the airfield luminaire, which can provide stable power to the LED across an AC cycle of an AC source.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A current converter circuit for airfield ground lighting, comprising:
   a bi-directional switch;
   an inductor configured to store energy in response to the bi-directional switch being on; and
   an output capacitor configured to discharge to power a light emitting diode (LED);
   wherein the bi-directional switch is configured to switch off to cause the inductor to discharge to the output capacitor in response to a voltage across the output capacitor being less than a threshold voltage.

2. The current converter circuit of claim 1, wherein the current converter circuit further includes a controller configured to monitor the voltage across the output capacitor.

3. The current converter circuit of claim 2, wherein the controller is configured to switch the bi-directional switch from on to off in response to the voltage across the output capacitor being less than the threshold voltage.

4. The current converter circuit of claim 1, wherein the bi-directional switch includes a first metal-oxide-semiconductor field-effect transistor (MOSFET) and a second MOSFET.

5. The current converter circuit of claim 4, wherein the inductor is connected between the first MOSFET and the second MOSFET.

6. The current converter circuit of claim 4, wherein the current converter circuit further includes an input capacitor connected to an alternating current (AC) source and configured to:
   charge to a voltage equivalent to an on-state resistance of the first MOSFET and a direct current (DC) resistance of the inductor; and
   buffer the current converter circuit to maintain a predetermined ripple voltage.

7. The current converter circuit of claim 1, wherein the output capacitor is configured to discharge to power the LED via an LED driver.

8. The current converter circuit of claim 1, wherein the current converter circuit further includes a controller configured to control an intensity of the LED using pulse width modulation.

9. A current converter circuit for airfield ground lighting, comprising:
   a bi-directional switch including a first metal-oxide-semiconductor field-effect transistor (MOSFET) and a second MOSFET;
   an inductor connected between a drain of the first MOSFET and a drain of the second MOSFET, wherein the inductor is configured to store energy in response to the bi-directional switch being on; and
   an output capacitor connected to the inductor and configured to discharge to power a light emitting diode (LED);
   wherein the bi-directional switch is configured to switch off to cause the inductor to discharge to the output capacitor in response to a voltage across the output capacitor being less than a threshold voltage.

10. The current converter circuit of claim 9, wherein:
    the current converter circuit includes a diode, wherein the diode is connected to the drain of the first MOSFET and the output capacitor; and
    in response to the inductor discharging, the diode is configured to direct current to the output capacitor during an input negative alternating current (AC) cycle of an AC source.

11. The current converter circuit of claim 9, wherein:
    the current converter circuit includes a diode, wherein the diode is connected to the drain of the second MOSFET and the output capacitor; and
    in response to the inductor discharging, the diode is configured to direct current to the output capacitor during an input positive alternating current (AC) cycle of an AC source.

12. The current converter circuit of claim 9, wherein:
    the current converter circuit includes a diode, wherein the diode is connected to a source of the first MOSFET; and
    in response to the inductor discharging, the diode is configured to direct current from the output capacitor to the first MOSFET during an input positive alternating current (AC) cycle of an AC source.

13. The current converter circuit of claim 9, wherein:
    the current converter circuit includes a diode, wherein the diode is connected to a source of the second MOSFET;
    in response to the inductor discharging, the diode is configured to direct current from the output capacitor to the second MOSFET during an input negative alternating current (AC) cycle of an AC source.

14. The current converter circuit of claim 9, wherein the first MOSFET and the second MOSFET are connected to an input capacitor.

15. A method for operating a current converter circuit for airfield ground lighting, comprising:
    shunting, by a bi-directional switch including a first metal-oxide-semiconductor field-effect transistor (MOSFET) and a second MOSFET, an input capacitor to provide current to an inductor connected between a drain of the first MOSFET and a drain of the second MOSFET in response to the bi-directional switch being on, wherein the input capacitor is connected to an alternating current (AC) source;
    switching, by the bi-directional switch, from on to off in response to a voltage across an output capacitor being less than a threshold voltage;
    discharging, by the inductor in response to the bi-directional switch being off, energy of the inductor to the output capacitor; and
    powering, by a discharge of the output capacitor, a light emitting diode (LED) in response to the inductor discharging energy to the output capacitor.

16. The method of claim 15, wherein shunting the input capacitor includes directing current from the AC source through the inductor by the first MOSFET and back to the AC source.

17. The method of claim 15, wherein discharging the energy of the inductor includes directing:
   current from the inductor to the output capacitor by a second diode; and
   current from the output capacitor to the first MOSFET by a third diode.

18. The method of claim 15, wherein shunting the input capacitor includes directing current from the AC source through the inductor by the second MOSFET and back to the AC source.

19. The method of claim 15, wherein discharging the energy of the inductor includes directing:
   current from the inductor to the output capacitor by a second diode; and
   current from the output capacitor to the second MOSFET by a third diode.

20. The method of claim 15, wherein the method includes switching the bi-directional switch from on to off at a predetermined switching frequency.

\* \* \* \* \*